(12) United States Patent
Perotto et al.

(10) Patent No.: US 9,074,516 B2
(45) Date of Patent: Jul. 7, 2015

(54) DEVICE FOR CONTROLLING SUPPLY OF A SYSTEM WITH A FLUID

(71) Applicant: Bontaz Centre, Marnaz (FR)

(72) Inventors: Stephane Perotto, Ayse (FR); Christophe Laguetre, Marignier (FR); Marlene Mangin, Araches la Frasse (FR)

(73) Assignee: BONTAZ CENTRE R&D, Marnaz (FR)

( * ) Notice: Subject to any disclaimer, the term of this patent is extended or adjusted under 35 U.S.C. 154(b) by 195 days.

(21) Appl. No.: 13/693,401

(22) Filed: Dec. 4, 2012

(65) Prior Publication Data

US 2013/0152883 A1 Jun. 20, 2013

Related U.S. Application Data

(63) Continuation of application No. 13/278,724, filed on Oct. 21, 2011, now abandoned, which is a continuation of application No. 13/062,293, filed as application No. PCT/EP2009/061647 on Sep. 8, 2009, now abandoned.

(51) Int. Cl.
| | |
|---|---|
| *F01P 1/04* | (2006.01) |
| *F01P 3/08* | (2006.01) |
| *F01P 3/10* | (2006.01) |
| *F16K 31/42* | (2006.01) |

(Continued)

(52) U.S. Cl.
CPC . *F01P 3/08* (2013.01); *F16K 17/04* (2013.01); *F16K 15/044* (2013.01); *F01P 3/10* (2013.01); *F16K 31/423* (2013.01); *F16K 31/0675* (2013.01)

(58) Field of Classification Search
CPC ...... F16K 15/044; F16K 17/04; F16K 31/065
USPC ............................... 123/41.35; 137/539, 522
See application file for complete search history.

(56) References Cited

U.S. PATENT DOCUMENTS

| 3,894,556 A | * | 7/1975 | Pareja | ........................... 137/539 |
| 4,391,296 A | * | 7/1983 | Abbott | .......................... 137/523 |

(Continued)

FOREIGN PATENT DOCUMENTS

| EP | 0 370 131 A | 5/1990 |
| EP | 1 529 935 B1 | 11/2004 |

(Continued)

OTHER PUBLICATIONS

International Search Report for PCT/EP2009/061647 dated Jan. 28, 2010.

*Primary Examiner* — Marguerite McMahon
*Assistant Examiner* — James Kim
(74) *Attorney, Agent, or Firm* — Pearne & Gordon LLP

(57) ABSTRACT

A system for cooling internal combustion engine pistons comprising an oil pump driven by the engine, jets projecting oil on the pistons, and a control device (2) interposed between the oil pump and the jets, where the control device comprises a valve (14) positioned between an oil inlet pipe (8) connected to the pressurised oil pump and a jet supply pipe (10), where said valve allows the oil to flow out from the pump to the jets when the oil pressure is at least equal to a threshold pressure, and where the device also comprises a solenoid valve (22) capable of causing the valve (14) to close by permitting the pressurised oil to be brought into contact with the closure member (16), in a direction of closure of the valve (14).

10 Claims, 5 Drawing Sheets

(51) Int. Cl.
*F16K 31/06* (2006.01)
*F16K 17/04* (2006.01)
*F16K 15/04* (2006.01)

(56) References Cited

U.S. PATENT DOCUMENTS

| | | | | |
|---|---|---|---|---|
| 4,480,660 | A * | 11/1984 | Bayart et al. | 137/478 |
| 4,543,988 | A * | 10/1985 | Huveteau | 137/542 |
| 6,164,322 | A * | 12/2000 | Najmolhoda et al. | 137/540 |
| 6,347,616 | B1 * | 2/2002 | Rodriguez et al. | 123/520 |
| 6,422,212 | B1 * | 7/2002 | Faix et al. | 123/506 |
| 7,559,296 | B2 * | 7/2009 | Perotto | 123/41.35 |
| 8,397,749 | B2 * | 3/2013 | Neto et al. | 137/539 |
| 2005/0098122 | A1 | 5/2005 | Bontaz | |
| 2006/0169331 | A1 * | 8/2006 | Neto | 137/539 |
| 2006/0243226 | A1 | 11/2006 | Bontaz et al. | |
| 2008/0223318 | A1 * | 9/2008 | Perotto | 123/41.35 |
| 2010/0163007 | A1 * | 7/2010 | Dohrmann et al. | 123/568.21 |

FOREIGN PATENT DOCUMENTS

| | | |
|---|---|---|
| FR | 2 885 170 A1 | 11/2006 |
| GB | 1 163 124 A | 9/1969 |
| GB | 2 431 219 A | 4/2007 |
| JP | 59-120712 A | 7/1984 |

* cited by examiner

DEVICE FOR CONTROLLING SUPPLY OF A SYSTEM WITH A FLUID

This application is a continuation of U.S. patent application Ser. No. 13/278,724 filed Oct. 21, 2011 which is a continuation of U.S. patent application Ser. No. 13/062,293 filed Mar. 4, 2011, which is incorporated herein by reference in its entirety.

DESCRIPTION

Technical Field and Prior Art

The present invention relates to a device for controlling the supply of a system with a fluid, for example the supply of jets cooling the pistons of an internal combustion engine with oil.

The cooling jets enable a cooling fluid such as oil to be projected against the bases of the pistons.

The cooling fluid is conveyed under pressure to the jets which vaporise this fluid when it is projected against the pistons. Pressurisation is obtained by means of a hydraulic pump, which is driven directly by the engine.

Such jets are of two types:
- a first type of jet permanently projects oil against the bases of the pistons, independently of the engine's operating conditions,
- a second type of jet contains a valve which opens only when the pressure of the cooling fluid reaches a given threshold value. The valve is formed by a piston and a spring, where the piston cooperates with a seat in order to block the passage of the fluid. Thus, when the engine is operating at low speed the pressure of the cooling fluid is less than the valve opening pressure, and the jets are not supplied. When the engine is operating at high speed the pressure of the cooling fluid increases until it exceeds the valve opening threshold value. The valve opens, allowing the jets to be supplied and the cooling fluid to be projected against the piston. The supply of cooling fluid can be interrupted only by reducing the pressure of the cooling fluid so that it once again falls below the threshold value. This threshold value is determined by the motor vehicle manufacturer. This value may, notably, be adjusted by modifying the load of the spring. This type of jet has the advantage that it reduces consumption of cooling fluid compared to the jet of the first type.

And reductions of this consumption of cooling fluid are constantly sought.

Accordingly it is one aim of the present invention to offer a device for controlling the supply of cooling fluid, enabling fluid consumption to be reduced still further, and generally it is one aim of the present invention to offer a device for controlling the supply of a system with a fluid.

BRIEF DESCRIPTION OF THE INVENTION

The above aim is met by a device comprising a valve allowing a fluid to pass from a fluid tank to at least one jet when the fluid is at a pressure higher than a given pressure, and a solenoid valve able to allow said fluid under pressure to be injected so as to cause the valve to close.

In other words, a single-direction valve controlled solely by pressure is associated with an electrically controlled valve to enable the single-direction valve to be closed regardless of the pressure of the fluid.

By means of the invention, interruption of the fluid supply is particularly simple and can be achieved at all pressure levels; a reduction of the fluid consumption can then be obtained.

Furthermore, this device is of a simple and robust design and can be adapted for all configurations. In the event of failure the fluid supply continues. As a consequence, in the case of the supply of jets to cool internal combustion engine pistons, the cooling of the pistons continues.

The subject-matter of the present invention is then principally a device for controlling the supply of a system from a fluid under pressure source comprising a valve intended to be positioned between a fluid under pressure inlet pipe and a supply pipe of said system, said valve allowing the fluid under pressure to flow out from the source to the system when the pressure of the fluid is at least equal to a threshold pressure, the valve having a closure member and an elastic means of return movement supported on a second face of the closure member, a first face of the closure member opposite the second face being intended to receive an effort from the fluid under pressure to cause the opening of the valve, and wherein the device also comprises a solenoid valve intended to be installed in a control pipe connected to the fluid under pressure inlet pipe and conveying the fluid under pressure to the second face of the closure member, said solenoid valve controlling the contact of the second face of the closure member with the fluid under pressure, and the solenoid valve being closed if there is no electrical power.

Advantageously, the valve comprises a sleeve for guiding the elastic means, wherein said sleeve is immobile, also forming a stop for the closure member in its maximum opening position, and where the sleeve comprises a recess receiving one end of the elastic means. The closure member may be a piston, and comprise a recess in its second face receiving another end of the elastic means.

The fluid under pressure reaches the second face of the closure member for example through the sleeve.

The solenoid valve is, for example, a proportional or "on-off" solenoid valve.

The valve may comprise at least one spur leading to a chamber formed by the closure member of the side of the second face of the closure member, to allow the outflow of the fluid trapped in this chamber when the valve is opened, said spur being intended to be connected to a low-pressure tank, and the dimensions of said spur being such that they allow pressure to be established in said chamber when the solenoid valve is opened.

For example, the solenoid valve has a mobile core in a coil and a magnetic circuit guiding the magnetic field able to be generated by the coil, an elastic means interposed between a magnetic stop and the core pushing the latter to the outside of the coil, a closure member pressed against a seat by the elastic means through the core, and the core being attracted inside the coil when a magnetic field is generated by the coil, allowing the closure member to become separated from the seat.

The elastic means of the solenoid valve is advantageously supported between the magnetic stop and a shoulder of the core, a part of the core being surrounded by the elastic means such that, when the core abuts a stop against the magnetic stop the elastic means is not completely compressed.

Advantageously, the control device according to the invention can comprise a casing in which the valve and the solenoid valve are installed so as to form a secure assembly intended to be installed in a housing comprising the inlet, supply and control pipes.

The subject-matter of the present invention is a system for cooling at least one internal combustion engine piston comprising an oil pump driven by the engine, at least one oil jet on the piston, said jet being supplied by the oil pump, a control device according to the present invention interposed between the oil pump and the jet, the control device being installed on a housing in which are installed the pressurised oil inlet pipe connected to the oil pump, the supply pipe connected to the jet, and the control pipe connected to the pressurised oil inlet pipe.

BRIEF DESCRIPTION OF THE DRAWINGS

The present invention will be better understood using the description which follows and the appended illustrations, in which.

DETAILED DESCRIPTION OF THE INVENTION

Figure 1:
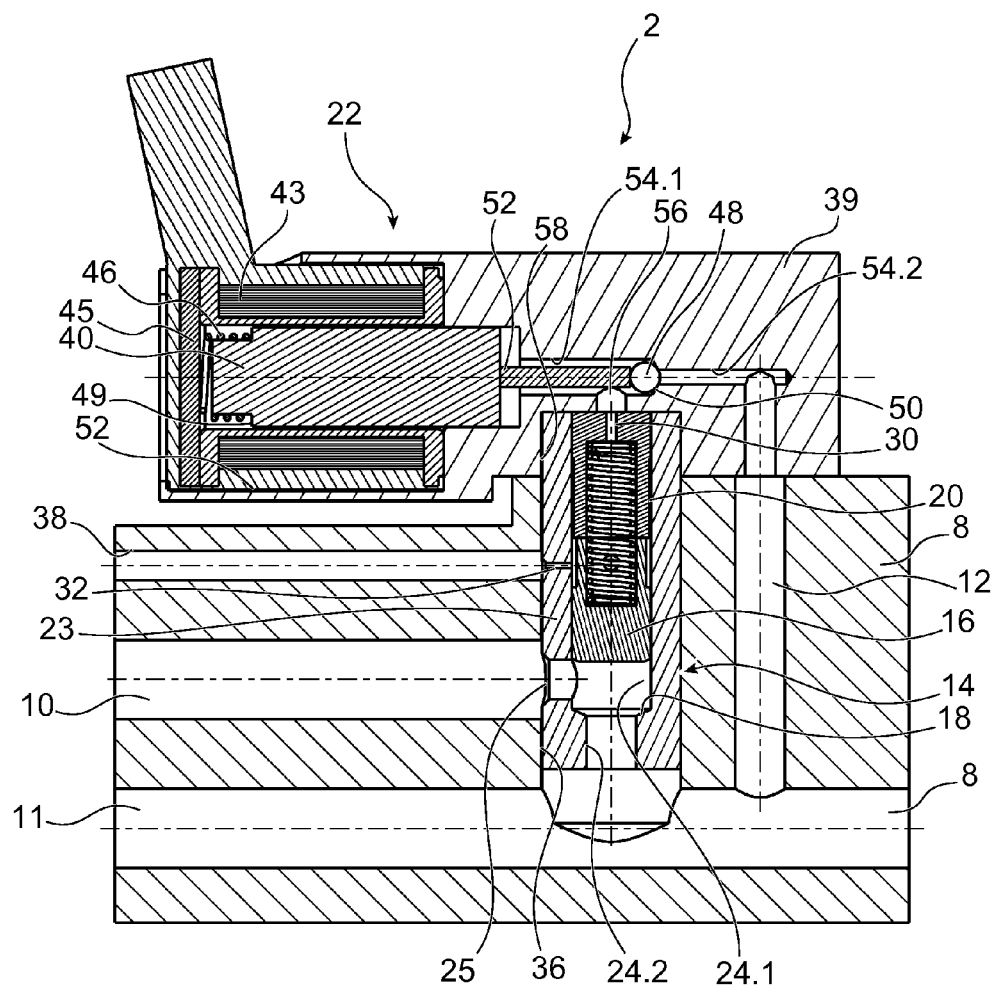
FIG. 1 is a section view of an example embodiment of a control device according to the present invention in a position of supplying the jets.

In the following description the example used to explain the invention will be that of the supply of the cooling jets; however, the present invention applies to all fields using fluids and requiring their supply to be controlled.

Moreover, for purposes of simplification, we shall use the term "oil" to speak of the hydraulic cooling fluid. However, it should be noted that the present invention is not limited to the use of oil, and that all hydraulic fluids able to reduce the temperature of the pistons may be suitable.

In FIGS. 1 to 3B it is possible to see an example embodiment of a control device according to the present invention.

The control device 2 according to the present invention is intended to be positioned between a pressurised oil source 3 (represented symbolically in FIG. 4) and at least one oil jet 4 (represented symbolically in FIG. 4) intended to project oil against the bases of the pistons (unrepresented) of an internal combustion engine. The control device 2 controls the pressurised oil supply of several jets, at least one per piston.

In the case of the control of the jets' oil supply, the control device is intended to be installed on an engine block 7.

The engine block 7 has a pressurised oil inlet pipe 8, a pipe 10 for supplying the pressurised oil jets and a pipe 12 for controlling the interruption of the jets' supply of oil.

The oil inlet pipe 8 is connected to the jet supply pipe 10 and to the control pipe 12.

In FIG. 1 it is possible to see the control device 2 according to the invention comprising a valve 14 positioned in the oil outflow path between the oil inlet pipe 8 and the jet supply pipe 10, and a solenoid valve 22 interrupting or permitting the passage of pressurised oil from the control pipe 12 to the valve 14.

The solenoid valve 22 is intended to be connected to an electronic control unit (unrepresented) sending orders to open or close the solenoid valve 22.

Figure 3A:
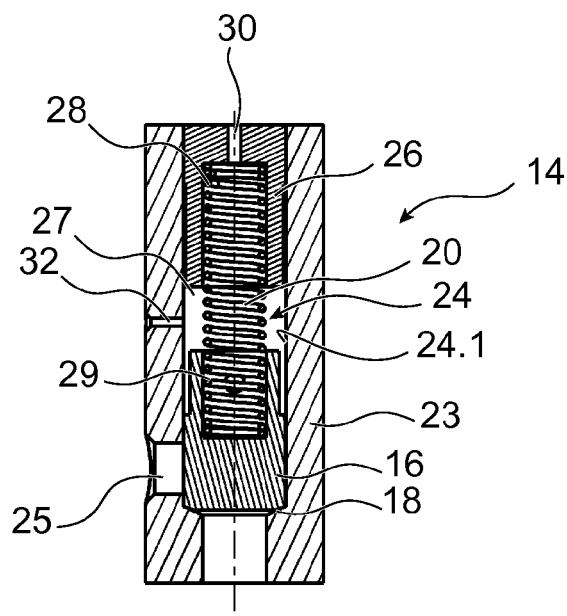
FIGS. 3A and 3B are detailed views of the control device of FIGS. 1, 2A and 2B.

In FIG. 3A, the valve 14 can be seen represented alone; it comprises a mobile closure member 16, a valve seat 18 with which the mobile closure member 16 cooperates, and an elastic means 20 opposing the movement of the mobile closure member 16.

According to the invention, the control pipe 12 is such that it conveys a part of the pressurised oil coming from the inlet pipe 8 on a second face 16.2 of the mobile closure member 16 of the valve 14, facing a first face 16.1 receiving the oil directly from the inlet pipe 8.

The first face 16.1 is an opening control face, and the second face 16.2 is a closure control face.

The valve 14 comprises a cylindrical body 23, pierced by a through-bore 24. The through-bore 24 comprises a first part of larger diameter 24.1 and a second part of smaller diameter 24.2 connected by an annular bearing forming the valve seat 18, where the part of smaller diameter 24.2 is directed towards the inlet pipe 8.

When the control device 2 is put in position on the engine block 7, the valve body 23 is assembled in sealed fashion in a bore 36 of the engine block 7, where the bore 36 connects the inlet pipe 8 and the jet supply pipe 10.

The valve body 23 comprises a first radial spur 25 connecting the bore 24 with the supply pipe 10.

The mobile closure member 16, which is formed, in this example embodiment, by a piston, is installed sliding in the part of larger diameter 24.1.

The first face 16.1 of the piston is supported by the valve seat 18.

The spring 20 is installed under compression between the second face 16.2 of the piston 16 and the valve body 23.

In the represented example a guide element 26 is assembled in the bore 24, formed by a sleeve installed immobile in the bore 24, for example installed by force in the bore 24. The sleeve 26 comprises an axial recess 28 receiving one end of the spring 20, holding the spring 20.

The piston 16 also advantageously comprises a central recess 29 to receive one end of the spring 20, improving its holding.

The sleeve 26 comprises, in its base, an axial spur 30 allowing the oil to flow out of the control pipe 12 to the piston 16.

Advantageously, the sleeve 26 forms a piston opening stop, enabling the maximum stroke of the piston to be adjusted easily. In addition, the structure of the spring mounting 20 between the piston 16 and the sleeve 26 allows the compression of the spring 20 to be restricted, and thus the risks of damage to the latter to be reduced.

The valve 14 is normally closed, i.e. the valve 14 is closed when the oil pressure is lower than the threshold pressure. In this case, the piston 16 is supported on the valve seat 18 and prevents supply of the jets. In this configuration, the piston 16 is separated from the sleeve 26 by the spring 20.

The body 23 comprises a second radial spur 32 opening on to the bore 24 in a chamber 27 formed by the piston and the sleeve 26. The second spur 32 forms a vent to evacuate any oil located in the chamber 27, when the piston 16 moves in the bore 24 in the direction of the sleeve 26. The radial spur 32 is connected to a low-pressure tank 33 represented in FIG. 4, such that the oil pressure in the chamber 27 does not oppose the movement of the piston 16, when the solenoid valve 22 is closed.

The valve 14 is assembled in the bore 26 such that the first radial spur 25 is located opposite the supply pipe 10, and the second radial spur 32 is positioned opposite a vent pipe 38 constructed in the engine block 7.

In an advantageous variant embodiment, annular grooves are provided on the outer periphery of the valve body 23 into which open the radial spurs 25 and 32 respectively, where these grooves allow the outflow of the oil to the supply pipe 10 and the vent pipe 38 respectively, whatever the orientation of the radial spurs. This embodiment helps facilitate assembly, since it is no longer required that the valve body is oriented precisely relative to the pipe 10 and of the engine block 7, during installation of the control device in the engine block 7.

We shall now describe the solenoid valve 22 in detail.

The solenoid valve is, for example, of the two-way, two-position type. The solenoid valve may be of the proportional type or of the "on-off" type.

The solenoid valve 22 is received in a casing 39.

Figure 3B:
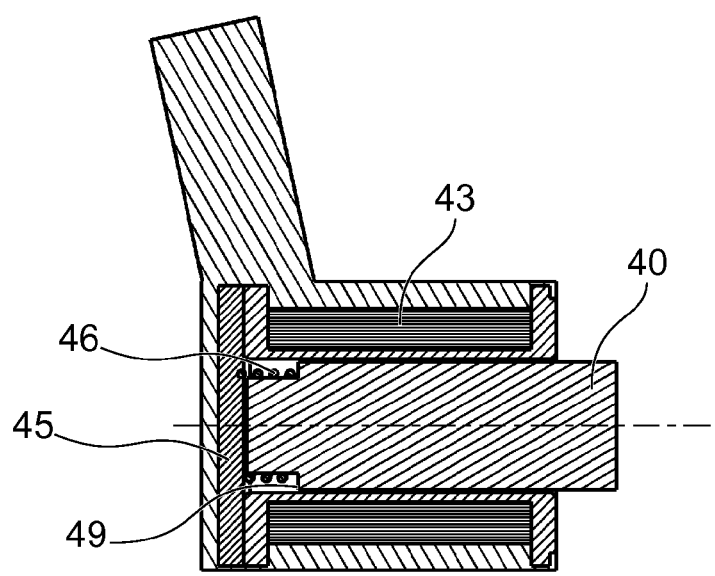

In FIG. 3B, the electromagnet controlling the opening and closing of the solenoid valve is represented in isolated fashion.

The electromagnet comprises a core 40 forming a magnetic mass, installed in unfixed fashion in a coil 43, and is capable of generating a magnetic field when traversed by a current. The coil is received in a housing 42 of the casing 39.

The casing 39 is advantageously made from a soft ferromagnetic material, channelling the magnetic field generated by the coil 43, forming a magnetic circuit with the mobile core 40. A magnetic stop 45 is installed at one end of the coil 43 to close the magnetic circuit. Advantageously, plastic overmoulding is applied around the coil 43 and the magnetic stop 45, enabling them to be secured easily, and to facilitate their installation in the casing 39.

An elastic means 46, in the represented example a helical spring, is installed under compression between the core 40 and the magnetic stop 45, tending to push the core 40 towards the outside of the housing 42.

Advantageously, the core 40 comprises a shoulder 49, on which one end of the spring 46 is supported; thus the spring 46 surrounds a part of the core 40. When the core 40 moves back under the effect of the magnetic field it abuts against the magnetic stop 45. Firstly, this stop restricts the stroke of the core 40, and secondly this prevents the spring 46 from being compressed completely; this construction reduces the risks of damage to the spring.

When the coil 43 generates a magnetic field the core 40 is attracted inside the coil against the magnetic stop 45, against the effort exerted by the spring 46.

The control pipe 12 is extended in the casing 39 by a pipe 54.

The solenoid valve 22 also comprises a closure member 48 formed, in the represented example, by a ball able to be supported on a seat 50. The position of the ball 48 is determined by the core 40, through a rod 52 connecting the ball 48 and the core 40. It is understood that this example is in no sense restrictive, and that every type of solenoid valve may be suitable.

The seat 50 is formed between a part of larger diameter 54.1 and a part of smaller diameter 54.2 of the pipe 54, where the ball 48 is housed in the part of larger diameter 54.1.

The control pipe 12 is connected to the bore 24 of the valve in the area of the part of larger diameter 54.1 of the pipe 54 by means of a radial spur 56, opposite the axial spur 30 of the sleeve, where the radial spur 56 is located beyond the ball 48 in the oil outflow direction.

The solenoid valve, particularly the ball 48, the spring 46 and the channels are dimensioned such that the ball 48 remains pressed against the seat 50 whatever the pressure of the oil, until an opening order is given.

The casing 39 of the solenoid valve is installed in a sealed fashion on the engine block 7; more particularly sealing is applied in the area of the junction between the control pipe 12 and the pipe 54, and in the area of the junction between the axial spur 30 and the radial spur 56.

Furthermore, sealing is applied between the electromagnet and the casing 39 to prevent leakage of oil originating from the control pipe 12.

In a particularly advantageous manner, the valve 14, the solenoid valve 22 and the casing 39 are produced as a secure assembly, which is added to the engine block 7 on to which it is attached, for example by means of screws or any other system.

To this end, the valve may be attached in the casing 39, for example by mounting in force of one end of the valve body 23 in a bore 58 made in the casing 39, and into which the radial spur 56 opens. By this means an integral assembly is produced which is easy to handle for its installation on the engine block 7.

We shall now explain the operation of the control device according to the present invention.

The pressurised oil flows out in the inlet pipe 8 and in the control pipe 12. The pressure of the oil is applied on to the first face 16.1 of the piston 16. While the oil pressure is below the threshold pressure the valve 14 remains closed and the jets are not supplied (unrepresented position). No fluid is consumed by the jets and it therefore remains available for other uses in the pipe 10 which is extended by the pipe 11.

If no current is applied to the coil 43, the ball 48 of the solenoid valve 22 is pressed on to the seat 50 due to the effort exerted by the spring 46 on the core 40. The solenoid valve 22 is therefore closed until an opening order is sent to it; the solenoid valve 22 therefore blocks the control pipe 12 and isolates the second face 16.2 of the piston 16; this face 16.2 therefore "does not experience" any pressure. We recall that the chamber 27 is connected to a low-pressure tank.

As can be seen in FIG. 1, when the oil pressure reaches the threshold pressure the piston 16 is moved in the direction of the sleeve 26 against the spring 20; the first face 16.1 of the piston 16 is separated from its seat 18 and allows the oil to flow out towards the jets, and the latter are then supplied. The oil contained in the chamber 27 between the piston 16 and the sleeve 26 is evacuated by the second radial spur 32, which is connected to a low-pressure zone.

The valve 14 closes again when the oil pressure becomes lower than the threshold pressure, or after a command is given to the solenoid valve 22.

Figure 2A:
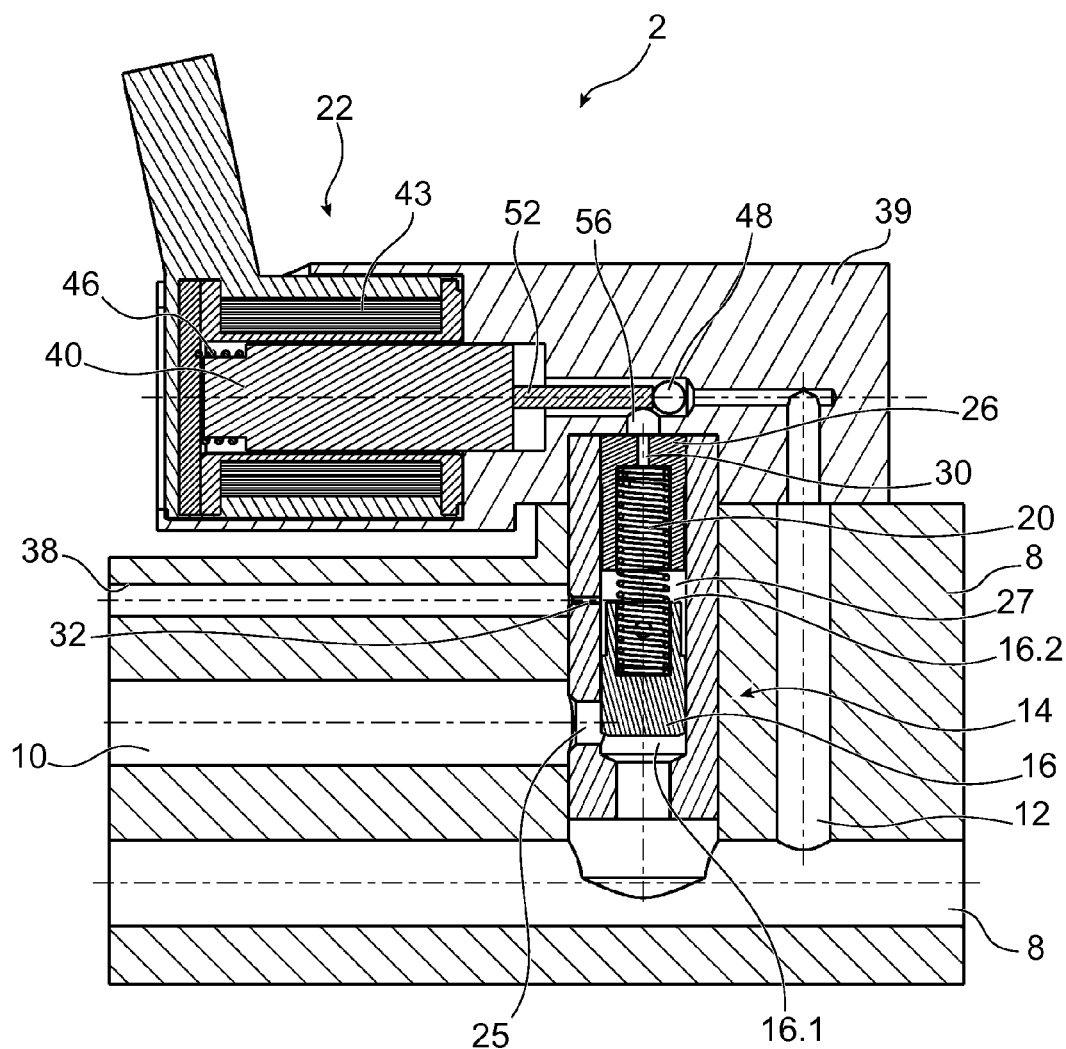
FIG. 2A is a section view of the control device of FIG. 1 during a phase in which the supply of jets are interrupted.

When it is desired to discontinue the supply of the jets, an order to open the solenoid valve is given by the control unit, an electric current traverses the coil 43, which generates a magnetic field, tending to move the core towards the inside of the housing 42 against the spring 46 pressed against the magnetic stop 45. The rod 52 no longer exerts any effort on the ball 48 which, under the action of the pressure of the oil in the control pipe 12 upstream from the solenoid valve, becomes separated from its seat 50, as can be seen in FIG. 2A. The oil then flows out in the radial spur 56, and then in the axial spur 30, traverses the sleeve 26, fills the chamber 27 between the sleeve 26 and the piston 16, and exerts an effort on the second face 16.2 of the piston 16 in the same direction as the spring 20 of valve 14. The piston 16 then moves in the direction of the seat 18 of the valve. In FIG. 2A it is possible to see the closure member 16 moving in the direction of its seat 18.

Figure 2B:
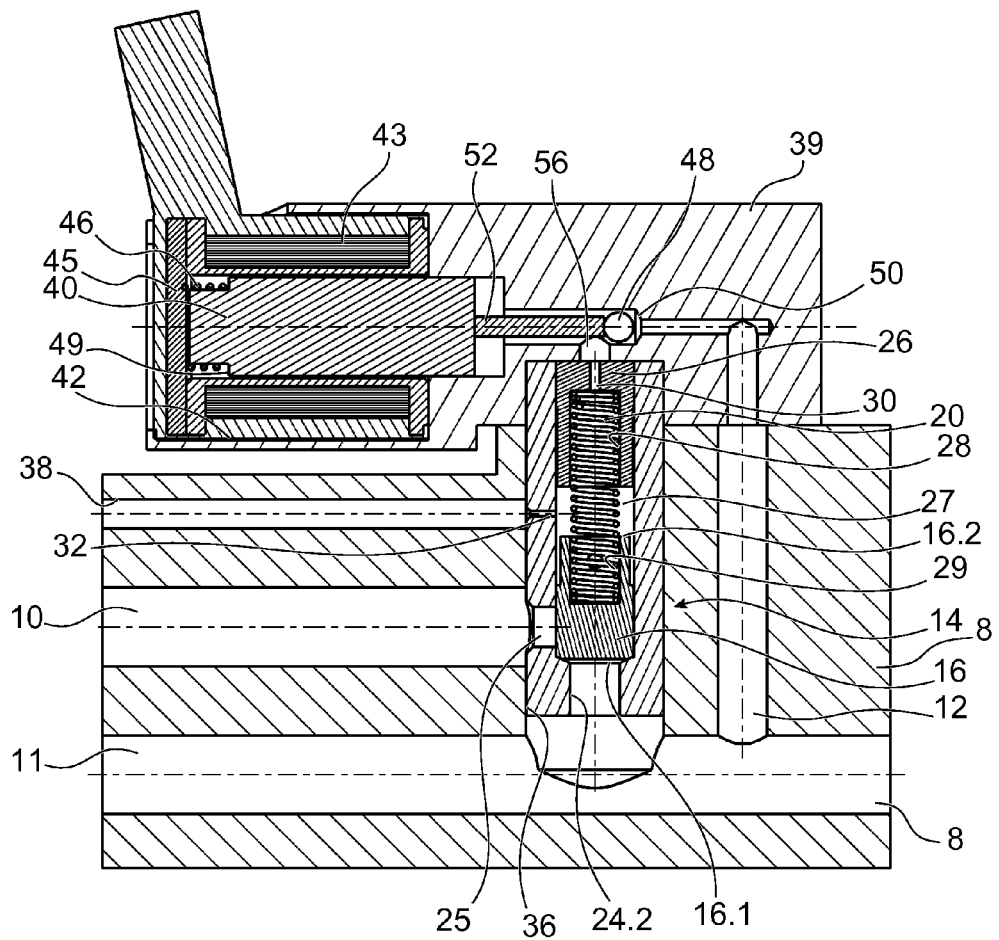
FIG. 2B is a section view of the control device of FIG. 1 in a position where the jets' supply is shut off completely.

The closure member slides until it is resting against the latter (FIG. 2B). The valve 14 is then closed and the jets are no longer supplied.

The diameter of the spurs, notably of the second radial spur 32, is determined so as not to create too large a leak, which would prevent the rise in pressure in the chamber 27, and would prevent the oil originating from the control pipe 12 from acting on the second face 16.2 of the piston 16. The diameter of the spur 32 is also determined so as to allow a leak of sufficient size for the oil presented in the chamber 27 not to oppose the opening of the valve 14.

When the solenoid valve is closed the oil contained in the chamber 27 is evacuated through the radial spur 32. If the pressure conditions are still met the valve opens again; otherwise it remains closed.

The control device according to the invention allows the supply of the jets to be permitted or discontinued in a simple manner. Advantageously, it is manufactured in the form of an assembly which is easy to handle, formed by the valve, the solenoid valve and the casing 39.

In addition, this closure is very rapid, and is possible at all pressures. This is therefore a device with a very broad range of uses. It enables the oil consumption to be reduced; the capacity of the oil pump can then be reduced. Since the latter is driven directly by the engine a reduction of fuel consumption can therefore be obtained.

It is understood that the relative positioning of the solenoid valve and of the valve in FIGS. 1, 2A and 2B is absolutely not restrictive, and all other positionings may be suitable, allowing great freedom in the manufacture of the device.

It is understood that an embodiment in the form of an assembly to be added on to the engine block is under no circumstances restrictive, and that all other configurations may be conceived.

In addition, this device requires little power to operate, which is particularly advantageous in the case of motor vehicles. Since the electromagnet can be small in size the power required to operate the solenoid valve is small.

This control device is particularly adaptable and can be manufactured taking account of the closure requirements, of the encumbrance and of the imposed production costs.

In addition, this device is extremely safe, even when operating in degraded mode. Indeed, if the solenoid valve 22 malfunctions the ball 48 remains pressed against the seat 50. Indeed, the closure member of the valve 14 is subjected only to the oil pressure on its first face 16.1. The oil is supplied as in the traditional devices and the pistons are consequently always cooled.

Figure 4:
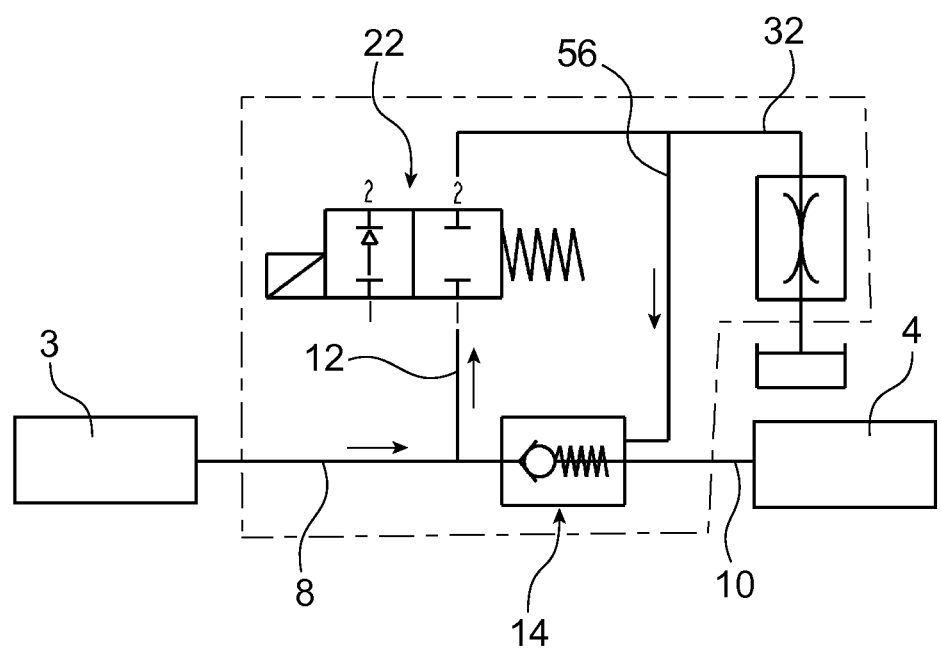
FIG. 4 is a schematic diagram of the control device according to the present invention.

In FIG. 4 a schematic diagram of the invention can be seen comprising the oil inlet pipe 8, the jet supply pipe 10 and the control pipe 12, the valve 14 between the oil inlet pipe 8 and the supply pipe and the solenoid valve 22 between the control pipe and the valve 14. The arrows indicate the fluid's outflow direction.

It is understood that the control device according to the invention is not restricted to the supply of jets for cooling internal combustion engine pistons, but applies to all systems in which it is desired to control in simple fashion the supply of hydraulic or pneumatic fluid.

The invention claimed is:

1. A device for controlling the supply of a system from a fluid under pressure source comprising:
a valve configured to be positioned between a fluid under pressure inlet pipe and a supply pipe of said system, said valve allowing the fluid under pressure to flow out from the source to the system when the pressure of the fluid is at least equal to a threshold pressure, the valve having a closure member and a return spring supported on a second face of the closure member, a first face of the closure member opposite the second face being configured—to receive an effort from the fluid under pressure to cause the opening of the valve;
a control pipe connecting the fluid under pressure inlet pipe and the second face of the closure member, said control pipe being configured to convey the fluid under pressure to the second face of the closure member; and
a solenoid valve configured to be installed in the control pipe, said solenoid valve being configured to control contact of the second face of the closure member with the fluid under pressure, and the solenoid valve being closed if there is no electrical power.

2. A control device according to claim 1, in which the valve comprises a sleeve for guiding the return spring, said sleeve being immobile, also forming a stop for the closure member in its maximum opening position, and the sleeve comprising a recess receiving one end of the return spring.

3. A control device according to claim 1, in which the closure member is a piston, comprising a recess in its second face receiving another end of the return spring.

4. A control device according to claim 2, in which the fluid under pressure arrives at the second face of the closure member through the sleeve.

5. A control device according to claim 1, in which the solenoid valve is a proportional or "on-off" solenoid valve.

6. A control device according to claim 1, in which the valve comprises at least one spur leading to a chamber formed by the second face of the closure member to allow the outflow of the fluid trapped in this chamber when the valve is opened, said spur being configured to be connected to a low-pressure tank, and dimensions of said spur being such that they allow pressure to be established in said chamber when the solenoid valve is opened.

7. A control device according to claim 1, in which the solenoid valve comprises:
a mobile core in a coil;
a magnetic circuit guiding a magnetic field able to be generated by the coil;
a spring interposed between a magnetic stop and the core pushing the core to the outside of the coil; and
a closure member pressed against a seat by the spring through the core, in which the core is attracted inside the coil when the magnetic field is generated by the coil, allowing the closure member to become separated from the seat.

8. A control device according to the claim 7, in which the spring of the solenoid valve is supported between the magnetic stop and a shoulder of the core, a part of the core being surrounded by the spring such that, when the core abuts against the magnetic stop the spring is not completely compressed.

9. A control device according to the claim 1, comprising a casing in which are installed the valve and the solenoid valve so as to form a secure assembly configured to be installed in a housing comprising the inlet, supply and control pipes.

10. A system for cooling at least one internal combustion engine piston comprising:
an oil pump driven by the engine;
at least one jet projecting oil on the piston, said jet being supplied by the oil pump;
a device for controlling the supply of a system from a fluid under pressure source interposed between the oil pump and the at least one jet, said device comprising a valve configured to be positioned between a fluid under pressure inlet pipe and a supply pipe of said system, said valve allowing the fluid under pressure to flow out from the source to the system when the pressure of the fluid is at least equal to a threshold pressure, the valve having a closure member and a return spring supported on a second face of the closure member, a first face of the closure member opposite the second face being configured to receive an effort from the fluid under pressure to cause the opening of the valve, a control pipe connecting the fluid under pressure inlet pipe and the second face of the closure member, said control pipe being configured to convey the fluid under pressure to the second face of the closure member, and a solenoid valve configured to be installed in the control pipe, said solenoid valve being configured to control contact of the second face of the closure member with the fluid under pressure, and the solenoid valve being closed if there is no electrical power, wherein the control device is installed on an engine block in which are installed the pressurized oil inlet pipe connected to the oil pump, the supply pipe connected to the jet, and the control pipe connected to the pressurized oil inlet pipe.

\* \* \* \* \*

UNITED STATES PATENT AND TRADEMARK OFFICE
CERTIFICATE OF CORRECTION

| | | |
|---|---|---|
| PATENT NO. | : 9,074,516 B2 | Page 1 of 1 |
| APPLICATION NO. | : 13/693401 | |
| DATED | : July 7, 2015 | |
| INVENTOR(S) | : Perotto | |

It is certified that error appears in the above-identified patent and that said Letters Patent is hereby corrected as shown below:

On the title page, item (30) insert -- (30) Foreign Application Priority Data Sept. 9, 2008 (FR)..........08 56052 --

In the specification

Column 5, line 1, insert -- 38 -- between "and" and "of"

Column 6, line 41, insert -- 22 -- between "valve" and "is"

Column 7, line 34, insert -- 16 -- between "member" and "of"

Column 7, line 42, insert -- 12 -- between "pipe" and "and"

Signed and Sealed this
Twelfth Day of January, 2016

Michelle K. Lee
*Director of the United States Patent and Trademark Office*